US012617658B2

(12) United States Patent
Lindström et al.

(10) Patent No.: US 12,617,658 B2
(45) Date of Patent: May 5, 2026

(54) CRANK ARRANGEMENT

(71) Applicant: Selden Mast AB, Västra Frölunda (SE)

(72) Inventors: Mathias Lindström, Västra Frölunda (SE); Björn Adiels, Ytterby (SE); William Holt, Gothenburg (SE)

(73) Assignee: SELDEN MAST AB, Vastra Frolunda (SE)

( * ) Notice: Subject to any disclaimer, the term of this patent is extended or adjusted under 35 U.S.C. 154(b) by 72 days.

(21) Appl. No.: 18/285,479

(22) PCT Filed: Apr. 1, 2022

(86) PCT No.: PCT/SE2022/050328
§ 371 (c)(1),
(2) Date: Oct. 3, 2023

(87) PCT Pub. No.: WO2022/250587
PCT Pub. Date: Dec. 1, 2022

(65) Prior Publication Data

US 2024/0182277 A1 Jun. 6, 2024

(30) Foreign Application Priority Data

May 28, 2021 (SE) .................................... 2150687-8

(51) Int. Cl.
*B66D 1/74* (2006.01)
*G05G 1/08* (2006.01)
*G05G 1/12* (2006.01)

(52) U.S. Cl.
CPC ........... *B66D 1/7473* (2013.01); *G05G 1/085* (2013.01); *G05G 1/12* (2013.01)

(58) Field of Classification Search
CPC ...... B66D 1/7473; G05G 1/082; G05G 1/085; G05G 1/10; G05G 1/12
See application file for complete search history.

(56) References Cited

U.S. PATENT DOCUMENTS 4,437,621 A 3/1984 Sakumoto
4,582,298 A * 4/1986 Boome .................... B66D 1/04 254/266

(Continued)

FOREIGN PATENT DOCUMENTS

CN 204921926 12/2015
CN 108046147 5/2018

(Continued)

OTHER PUBLICATIONS

International Search Report issued in parent PCT/SE2023/050932, May 1, 2024, pp. 1-2.

(Continued)

*Primary Examiner* — Adam D Rogers
(74) *Attorney, Agent, or Firm* — Jeffrey S. Melcher; Melcher Patent Law PLLC

(57) ABSTRACT

A crank arrangement (100) for operating a winch having an elongate crank arm (10), a hollow driving head (29) having an external engagement profile, a handle part (40) and a locking plate (25) arranged at an outer end of an actuator element rotatably taken up within the hollow driving head (29). Hinged lever arms (11A, 11B) extend in parallel on external opposite side walls of the crank arm (10) having protruding pins (18A, 18B) for, when at least one hinged lever arm (11A, 11B) is gripped, actuating upon the actuator element rotationally connected to the locking plate (25) such that the locking plate (25) will perform a rotational movement to assume a first position in which the locking plate (25) is aligned with the engagement profile of the driving head (29). When at least one the hinged lever arms (11A, 11B) is released, the locking plate (25) will be rotated to assume a second, locking, position in which it is misaligned with the engagement profile (30) of the driving head (29) limiting the rotational movement of the actuator element (Continued)

being provided. The locking plate (25) can be rotated to assume the first position via a one-hand grip.

20 Claims, 8 Drawing Sheets

(56) References Cited

U.S. PATENT DOCUMENTS

| | | | | | |
|---|---|---|---|---|---|
| 4,924,795 | A | | 5/1990 | Ottemann | |
| 5,255,573 | A | * | 10/1993 | Estabrook | B66D 1/7468 74/543 |
| 5,582,080 | A | * | 12/1996 | Barmore | B25B 13/463 81/177.85 |
| 6,921,060 | B2 | * | 7/2005 | Weed, Jr. | G05G 1/085 254/266 |
| 7,114,705 | B2 | * | 10/2006 | Steiner | G05G 1/082 81/177.85 |
| 7,226,042 | B2 | | 6/2007 | Lewmar | |
| 2002/0092454 | A1 | | 7/2002 | Meyerdierks | |
| 2005/0229739 | A1 | | 10/2005 | Steiner | |
| 2022/0371711 | A1 | | 11/2022 | Janhall | |
| 2024/0002200 | A1 | | 1/2024 | Jahnhall | |
| 2024/0182277 | A1 | | 6/2024 | Lindstrom | |

FOREIGN PATENT DOCUMENTS

| | | | | |
|---|---|---|---|---|
| CN | 210686874 | | | 6/2020 |
| DE | 21 02 790 | | | 8/1972 |
| DE | 42 32 329 | | | 3/1994 |
| DE | 10348642 | A1 | * | 5/2005 |
| EP | 1 582 297 | | | 10/2005 |
| GB | 1 371 994 | | | 10/1974 |
| GB | 2276137 | | | 9/1994 |
| WO | 2008/119108 | | | 10/2008 |
| WO | 2010090524 | | | 8/2010 |
| WO | 2011/049443 | | | 4/2011 |
| WO | 2021/096404 | | | 11/2019 |
| WO | 2022/154707 | | | 7/2022 |
| WO | 2024076278 | | | 4/2024 |

OTHER PUBLICATIONS

Written Opinion issued in parent PCT/SE2023/050932, May 1, 2024, pp. 1-10.

International Search Report issued in parent PCT/SE2020/050880, Jan. 25, 2021, pp. 1-2.

Written Opinion issued in parent PCT/SE2020/050880, Jan. 25, 2021, pp. 1-12.

International Search Report issued in parent PCT/SE2021/051202, Feb. 25, 2022, pp. 1-2.

Written Opinion issued in parent PCT/SE2021/051202, Feb. 25, 2022, pp. 1-6.

International Search Report issued in parent PCT/SE2022/050328, Jun. 29, 2022, pp. 1-4.

Written Opinion issued in parent PCT/SE2022/050328, Jun. 29, 2022, pp. 1-5.

* cited by examiner

CRANK ARRANGEMENT

TECHNICAL FIELD

The present invention relates to a crank arrangement having the features of the first part of claim 1. More particularly it relates to a winch handle releasably engageable with a winch of a sailing boat. The invention also relates to an assembly comprising a crank arrangement and a winch having the features of the first part of claim 16.

BACKGROUND

On a sailing boat there may be several different kinds of sails, mainsails, spinnakers, jibs, headsails, and genoas. The sails are supported by one or more masts. The sails are attached to lines or wires holding them in place and applying tension to the sails and supporting e.g. the mast. The lines, or wires, are denoted differently depending on location and function or attachment such as headstay, backstay, shrouds, sheets, halyards, etc.

In order to be able to handle sails and rig usually different kinds of arrangements are used wherein a rotating part is operated manually by an operator via lines/wires and/or toothed gear wheels or similar. Some specific examples on functions for which such arrangements are used for operation/control are for setting, sheeting in, reefing, hauling out, and hauling down sail, tightening of running rigging, e.g. kicking strap, backstay runner and halyards.

Manually operated winches are very common on sailing boats. A winch or a similar driving unit comprises a driving shaft and a socket allowing reception of a driving or engagement portion of a crank arrangement such that, when a winch handle part is manually operated, the manual force to which the handle is exposed is transformed into a torque in the winch, or more generally, the driving unit, hence allowing it to be rotated around an axis. In order to allow engagement between a winch handle and a winch socket, the shape and dimensions of the engagement surfaces of the winch socket and of the engagement portion of the winch handle have to mate well in order to enable proper transfer of torque from the manually operated winch handle to the winch and to avoid damages and wear on either of the surfaces. Winch sockets are often dimensioned and formed according to legacy industry standards allowing proper engagement with an engagement part, a lug, or a driving head, of a crank arrangement, a winch handle, with an adequate corresponding engagement profile.

Common for most winch crank arrangements, in the following also simply denoted winch handles, is that they comprise an elongate crank arm with a driving head or lug adapted to mate with a receiving portion, also called receiving cavity, of winch sockets, such that engagement between winch socket and winch handle is enabled.

The elongate crank arm in most known crank arrangements is arranged to extend mainly perpendicularly to a center axis of the driving head generally equipped with a locking mechanism to secure the winch handle to the winch during operation.

At the other end of the crank arm a handle part is disposed, which extends mainly perpendicularly to the crank arm, and is oriented mainly in parallel with the main axis of the driving head.

The handle part is generally arranged to be rotatable around an axis extending substantially perpendicularly to the longitudinal extension of the crank arm.

It is a problem that a crank arrangement (a winch handle) may be unintentionally released or detached from the winch socket. In order to prevent or reduce the risk of such unintentional release, as referred to above, different locking mechanisms have been used.

One known type of locking mechanism is based on using a rotatable part which can be rotated between a locking position and an unlocking position in which the winch handle can be released.

Several winch crank arrangements using a locking mechanism based on the principle with a rotatable part are known. Generally such a locking mechanism comprises a plate which is connected to a circular rod which runs through a key grip. The plate with the rod is so mounted that the plate can be rotated through a central axis of the key grip. The receiving part of the driving unit in the winch socket is provided with a flange such that the plate in given positions locks axially against the flange and can pass the flange when rotated a certain angle with respect to said given positions. The shaft is on the side opposite to the side of the key grip, in the direction of the shaft, connected to an actuating part which e.g. extends perpendicularly from the center axis of the rod, on an upper side of the which handle. The actuating part is kept in a neutral position e.g. by means of a spring. In the neutral position the plate is held in such a position with respect to the axial geometry of the driving shaft that the plate prevents the winch handle from being released or detached from the driving shaft when the winch handle part comprising the key grip is taken up in the receiving part of the driving shaft.

In the neutral position, and when the winch handle key grip part is engaged within the receiving part of the driving shaft, the plate is held in such a position with respect to the axial geometry of the driving shaft that the plate prevents the winch handle part from being released from the driving shaft, and when the winch handle is released from the driving shaft, i.e. the key grip is outside the receiving part, it cannot be engaged with the driving shaft since the key grip cannot pass into the receiving part.

In order to introduce the key grip into the receiving part of the driving shaft, or to remove the winch handle when the key grip is inside the receiving part of the driving shaft, an operator presses on the actuating part until it has turned to an end position in which the actuating part, with interconnected rod and locking plate, can rotate to a position in which the plate is allowed to be inserted axially in the receiving part, the socket, and such that the winch handle can be released from the receiving part of the winch socket.

Such solutions, e.g. disclosed in U.S. Pat. Nos. 5,255,573 and 6,921,060, are advantageous in so far that they generally are quite simple and robust, comprising few movable parts, and have been useful in marine environments where unprotected movable parts are exposed to dirt, salts and where corrosion constitutes a problem.

WO2008/119108 discloses a winch handle with a lug for engaging with a winch socket with a locking plate connected to the lug. A self-aligning guide is attached to or integral with the locking plate for guiding the lug into engagement with the winch socket regardless of the orientation of the locking plate with respect to the lug. An external lever arranged on the upper side of the crank arm is provided for facilitating rotation of the locking plate.

A disadvantage, however, with winch crank arrangements based on such a rotatable locking mechanism, is that, in order to achieve a release position, the winch handle arm part has to be gripped at the same time as an actuator (e.g. a button) has to be turned to reach its end position. This means that different maneuver operations cannot take place as fast as would be desirable, such as for example stay turning maneuvers. In addition, they are disadvantageous from an ergonomic point of view, and two hands may be needed. The external actuator also is exposed and could be either to easily actuated, in which case there is a risk of an accidental removal of the winch handle, or alternatively be hard to turn or operate. Also, the flange in the driving shaft locking the locking plate is exposed to wear and may be damaged.

Another type of locking mechanism is based on using elements that via a translational motion can move between a locking position and an unlocking position in which the winch handle can be released. Winch handles using locking mechanisms based on translationally movable parts generally comprise one or more parts which can perform a linear movement, perpendicularly to the center axis of a key grip. The movable parts are actuated upon by means of a separate part, which is movable axially with the key grip in such a way that the parts movable perpendicularly to the center axis lock against a flange in the receiving part of the driving shaft, the winch socket. The part movable axially with the key grip is in known arrangements generally actuated upon by means of a pivotally mounted elongate element arranged along, and e.g. taken up in a recess on the upper side of the arm part.

The unlocking, release position, is then achieved through pressing the pivotally mounted elongate element towards the arm part towards an inner end position in which it actuates upon the movable part which is movable axially with the key grip, which movable part in turn acts on parts or elements which are movable in a linear direction perpendicularly to the center axis of the key grip such that said movable locking parts move away from the flange until an unlocking position is achieved. The pivotally mounted elongate element may in some known arrangements be pressed inwards to reach the inner end position by means of one hand gripping around the arm part. Through releasing the grip around the arm part, the pivotally mounted elongate element is spring biased and forced back towards an outer end position in which the axially with the key grip movable part is moved to a position in which the linearly and perpendicularly to the center axis of the key grip movable parts are moved to a position in which the key grip is allowed to pass through the receiving part and the winch handle can be released from the winch socket driving shaft.

An advantage of such winch handles, which are based on a translating element locking mechanism, is that they can be released from the winch by gripping around the arm part, i.e. it is not necessary to reach the key grip area. Maneuver operations are faster than for winch handles which are based on a rotating element locking mechanism.

However, known winch handles based on a translating element locking mechanism still suffer from several disadvantages. One disadvantage is that the size and stroke length of the linearly movable parts are dependent on the dimensions of the receiving part of the driving shaft, the winch socket, which follow given standards for winches. Small dimensions of the locking element parts may influence the locking reliability since even a slight wear may have considerable effects on the locking functionality. Further, the fact that such a locking mechanism comprises a plurality of towards each other movable parts negatively affects the robustness, assembly and maintenance. Still another disadvantage is that the movable parts are exposed to dirt, salts and other environmental external factors, corrosion, which may affect the locking functionality.

EP 1 582 297 and U.S. Pat. No. 7,114,705 show grab activated self-locking winch handles suffering from the disadvantages discussed above.

Thus, known winch handles as discussed above all suffer from considerable drawbacks and, so far, there are no satisfactory solutions available.

SUMMARY OF THE INVENTION

It is therefore an object of the present invention to provide a solution to one or more of the above-mentioned problems. It is a particular object to provide an improved crank arrangement. It is particularly an object to provide a crank arrangement that is easy and safe to operate. Another object is to provide a crank arrangement that allows fast maneuvers. It is also an object to provide a crank arrangement that is robust. Still another object is to provide a crank arrangement with a reliable, robust and durable locking mechanism. Another particular object is to provide a crank arrangement which is wear resistant, and resistant to corrosion when exposed to dirt, humidity, salt water environments. Another particular object is to provide a crank arrangement with a locking mechanism that is easy to fabricate and maintain. Particularly it is an object to provide a winch handle for a sailing boat fulfilling one or more of the above mentioned objects.

A most particular object is to provide a crank arrangement that is safely locked to a driving arrangement when engaged and prevents accidental, involuntary release.

Therefore, a crank arrangement as initially referred to is provided which comprises the characteristic features of the characterizing part of claim 1.

It is therefore also an object to provide an assembly comprising a crank arrangement and a winch through which one or more of the above mentioned problems are solved.

Therefore an assembly as initially referred to is provided which has the characterizing features of claim 16.

Advantageous embodiments are given by the respective appended dependent claims.

BRIEF DESCRIPTION OF THE DRAWINGS

The invention will in the following be further described, in a non-limiting manner, and with reference to the accompanying drawings, in which.

DETAILED DESCRIPTION

Figure 1:
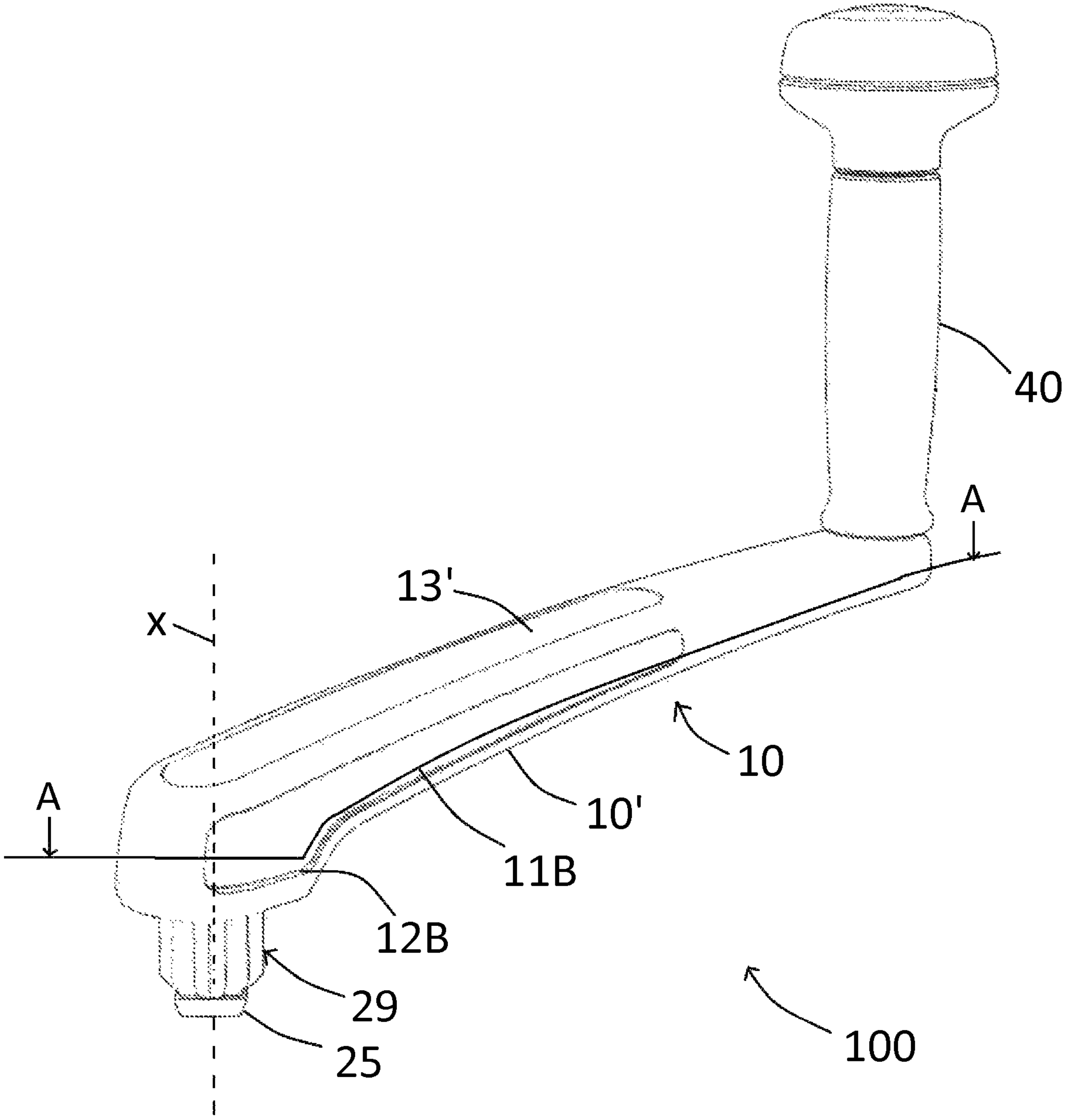
FIG. 1 is a schematic view in perspective of a winch handle according to the present invention for releasable engagement with a winch socket.

FIG. 1 shows a winch handle, or more generally a crank arrangement 100, which in a releasable manner can be engaged with, and locked within, a winch socket 200 (cf. FIG. 2) of a winch on a sailing boat wherein the winch socket 200 can be rotated when in engagement with a driving head 29 of the winch handle 10 rotating around an axis x.

The winch handle 100 comprises an elongate crank arm 10 at, or close to, one end of which a handle part 40 is provided, substantially perpendicularly to the longitudinal extension of the crank arm 10. The crank arm 10 comprises a crank arm base section 10' and two hinged lever arms 11A,11B extending in parallel on opposite outer sides of the crank arm base section 10' and receivable in hinged lever arm recesses 12A,12B provided on the opposite outer sides of the crank arm base section 10'. On an upper part of the crank arm base section 10' a protective cover element 13' is shown which is arranged to cover an upper recess 13 (cf. FIG. 2).

At an end portion of the crank arm 10, facing in a direction substantially opposite to a direction in which the handle part 40 protrudes, a hollow driving head 29 is provided which has an external engagement profile 30 allowing it to be axially introduced into a winch socket 200 receiving cavity 201 of a winch 210 (see FIGS. 4A-4C) with a receiving portion engagement profile mating with the engagement profile 30 of the driving head 29, in the shown embodiment an octagonal, star shaped, profile. At the lower end of the hollow driving head 29 a locking plate 25 is shown which is connected to an actuator connecting rod 26 of an actuator element 20 (cf. FIG. 2) housed in a rotatable manner within the driving head 29.

Figure 2:
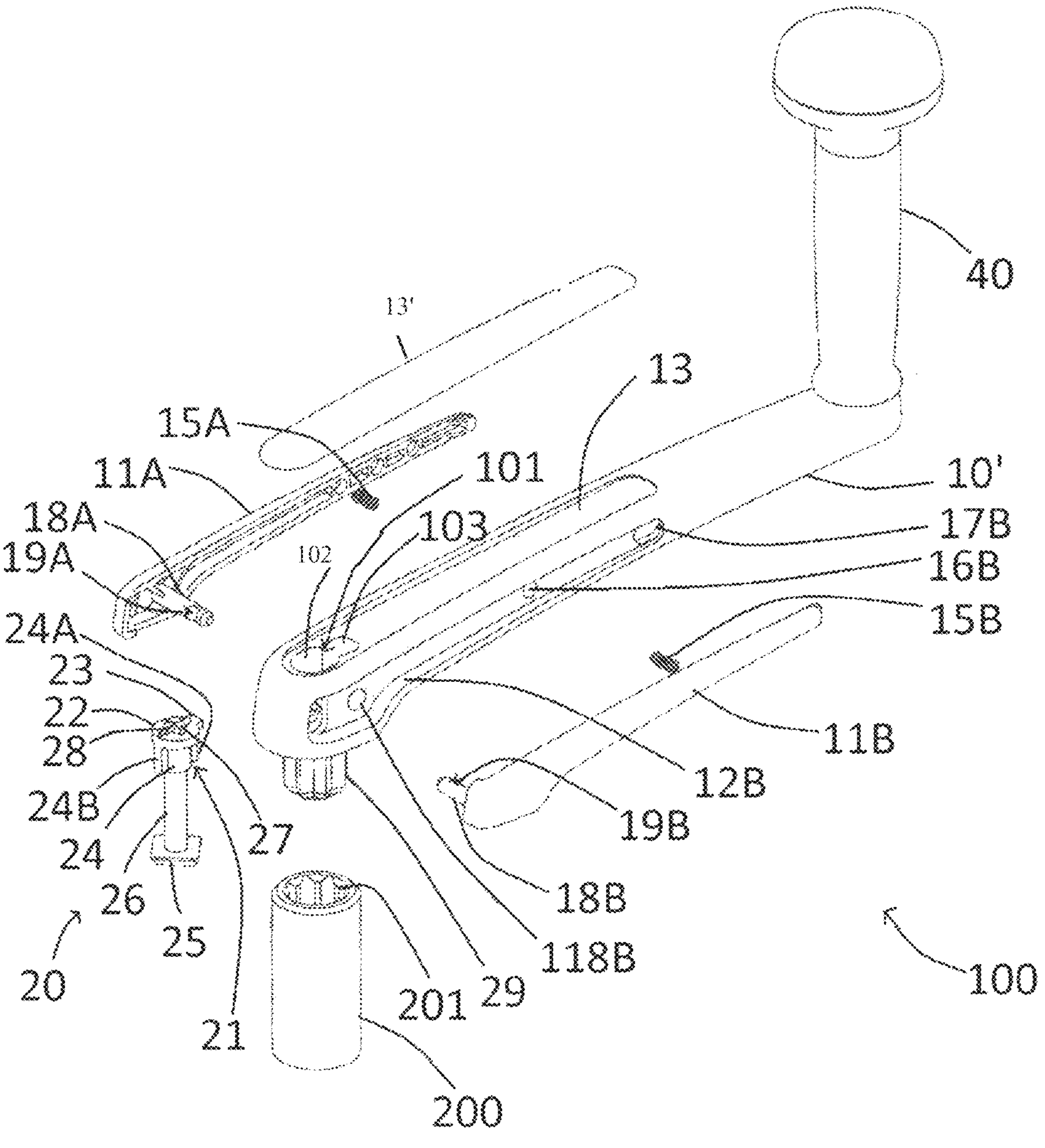
FIG. 2 is an exploded view in perspective of the winch handle shown in FIG. 1.

FIG. 2 is an exploded view of a first embodiment of the winch handle 100 according to the present invention. FIG. 2 for illustrative purposes very schematically illustrates a winch socket 200 with a receiving cavity 201 with which the winch handle 100 can be operatively engaged.

FIG. 2 shows the crank arm 10 comprising the crank arm base section 10' and the two elongate hinged lever arms 11A,11B. The crank arm base section 10' as referred to above comprises two elongate recesses 12A,12B, each for receiving one of said hinged lever arms 11A,111B. The hinged lever arms 11A,11B are pivotally mounted around each a rotation axis (not shown) disposed in openings 17A,17B in the crank arm base section 10' elongate recesses 12A,12B, the rotation axes extending in parallel, and being substantially perpendicular and vertically disposed with respect to the longitudinal extension of the crank arm 20 and located adjacent the end portions of the recesses 12A,12B distant from the driving head 29, and the end sections of the hinged lever arms 11A,11B distant from the driving head 29. (As an alternative to the recesses 17A,17B, a pin connection may be used.) Thereby each lever arm 11A,11B is allowed to rotate around its rotation axis between a first position in which it is substantially taken up in the recess 12A,12B, corresponding to an engagement/disengagement state in which the winch handle 100 can be engaged with/disengaged from a winch socket 200, and a second position wherein each lever arm 11A,11B are pivoted outwards, away from the crank arm base section 10', around their respective pivot axes, corresponding to a locking state, or an engaged state, in which the winch handle 100 can be locked in the winch socket 200, through the crank arm 10 being grabbed/released through a one hand gripping/releasing operation as will further described below.

The hinged lever arms 11A,11B are here spring biased or loaded by means of compression springs 15A,15B arranged between the crank arm base section 11' and a respective hinged lever arm 11A,11B to which they are connected. The compression springs 15A,15B are fastened by means of spring holding members (not shown) arranged in spring receiving openings 16A,16B in the crank lever arm recesses 12A,12B in the crank arm base section 10' and to the respective lever arms 11A,11B at a distance from the rotation axes and urge the lever arms 11A,11B to assume a second position, i.e. when the hinged lever arms are free, not gripped, or released from a grip, i.e. in a released state, and in which the winch handle 100 can be locked in a winch socket 200 if having been introduced into the winch socket 200. In this state it is also not possible to introduce the winch handle 100 driving head 29 into the winch socket 200, i.e. the winch handle 10 cannot be engaged with the winch socket 200, nor can it be disengaged if already engaged in the winch socket 200. When the crank arm 10 is gripped, the lever arms 11A,11B are against the action of the compression springs 15A,15B pivoted around their rotation axes towards a longitudinal center axis of the crank arm 10 and taken up in the recesses 12A,12B, corresponding to the first position, allowing engagement/disengagement of the winch handle 100.

The lever arms 11A,11B, on their respective side sections facing the crank arm base section 10' each comprises a protruding actuating pin 18A,18B, each actuating pin 18A, 18B being perpendicular to the hinged lever arm 11A,11B on which it is disposed, and directed towards the crank arm base section 10', and located at different distances from the respective outer ends of the hinged lever arms (11A,11B). The crank arm base section 10' on each side comprises a transversal pin receiving opening 118A,118B (only 118B shown in FIG. 2) which are arranged at a first and a second distance respectively from the outer end of the crank arm base section 10' distant from the handle part 40.

The protruding actuating pins 18A,18B are arranged at first and a second distance respectively from the end of the respective hinged lever arm 11A,11B, each protruding actuating pin 18A, 18B being provided with a gripping recess 19A,19B. The actuating pin 18A of first hinged lever arm 11A is here arranged at first distance from the end of the hinged lever arm 11A which is larger than the distance from the end of the other hinged lever arm 11B at which the second actuating pin 18B is located. The difference in distance from the respective end portions of the hinged lever arms 11A,11B to the respective actuating pins 18A,18B is such as to allow reception of an actuating member 21 of a rotatable actuator element 20, as will be more thoroughly described below, between the actuating pins 18A,18B in such a way that gripping recess 19A on hinged lever arm 11A mates with a first actuation shoulder 24A of the actuating member 21 and gripping recess 19B on hinged lever arm 11B mates with a second actuation shoulder 24B of the actuating member 21, hence allowing the interaction between the hinged lever arms 11A,11B and the rotatable actuator element 20.

Since the hinged lever arms 11A,11B are both operatively connected to the rotatable actuator element 20, either one of, or both hinged lever arms 11A,11B can be pressed/released (moved between a loaded state in which a load is applied to the compression spring, the compression spring is compressed, and a released state in which no force is applied to the compression spring) to move the actuator element 20, and hence to achieve the engagement/disengagement state and the locking state respectively.

In an alternative embodiment (not shown) there is only one hinged lever arm or only one lever arm that can be moved to rotate the actuator element 20 and hence the locking plate 25.

In alternative embodiments (not shown) the protruding actuating pins may be provided with protrusions for engagement with recesses provided in the actuation shoulders instead.

The crank arm base section 10' on an upper side comprises a keyhole shaped recess 101, the narrow end 103 of the keyhole, in the following denoted cutout, being directed towards the handle part 40, the circular part 102 of the keyhole shaped recess 101 facing the outer end of the crank arm base section 10' and being coaxial with a hollow driving head 29 here having an octagonal external shape, engagement profile 30. The keyhole shaped recess 101 has a depth substantially corresponding to the height of an upper plate 22 of actuator element 20. The upper plate 22 of the actuator element 20 comprises a circularly shaped plate of substantially the same dimensions as the key hole circular recess 102, but slightly smaller allowing it to be received therein, and an actuation protrusion 23 with dimensions smaller than the narrow part 103 of the keyhole (the cutout) to allow rotation of the upper plate 22 between a first position in which the actuation protrusion 23 is blocked by a side wall 103' of narrow portion or cutout 103 and in which the winch handle 100 is in a position allowing engagement/disengagement of the winch handle 100, and a second position in which the actuation protrusion 23 is blocked by an opposed wall 103" of the cutout 103 of the keyhole 101 corresponding to a locked position (a neutral position) in which the winch handle 100 is locked when received in a winch socket receiving cavity 201, and the hinged lever arms 11A,11B released (and rotated outwardly) as will further described below. In the second position the winch handle 100 cannot be engaged with/disengaged from the winch socket.

The actuator element 20 further comprises a locking plate 25 of, here, a substantially square shaped transverse cross-section, connecting to a lower end of an actuator connecting rod 26 at the opposed end of which actuating member 21 of the actuator element 20 is provided. The actuating member 21 comprising the upper plate 22 with the actuation protrusion 23 further comprises a first actuation shoulder 24A and a second actuation shoulder 24B which are provided on opposed sides of an actuating member 21 cylindrical receiving portion 24 and extend axially downwards from the upper plate 22. The first actuation shoulder 24A and the second actuation shoulder 24B protrude on opposite sides of the cylindrical receiving portion 24 which is adapted to receive the actuator connecting rod 26 and extend a certain distance in the direction towards the locking plate 25. The first and second actuation shoulders 24A, 24B are so arranged that the first actuation shoulder 24A will be actuated upon through engagement with the first actuating pin 18A recess 19A and the second actuation shoulder 24B will be actuated upon through engagement with the second actuating pin 18B recess 19B when the hinged lever arms 11A,11B are gripped, moving the actuating pins 18A,18B through pin openings 118A,118B in the crank arm base section 10' and hence rotate the actuating member 21, as well as when the hinged lever arms 11A,11B are released, the actuating member 21 will be actuated upon to rotate in the opposite direction. When the actuating member 21 is rotated, also the locking plate 25 will be rotated.

The rotational movement of the actuator element 20 received in driving head 29 is thus limited through the shoulders 24A,24B being blocked when getting in contact with inner walls 103',103" of the keyhole narrow portion 103, or cutout, in the crank arm base portion 10'.

In the shown embodiment, with a driving head 29 having an octagonally shaped external engagement profile 30 as discussed above, the rotational movement is limited to 22.5° (1/16 of a full turn). The locking plate 25 is connected, e.g. fixedly, to the actuating member 21 via the actuating element rod 26 such that also the locking plate 25 will be rotated when the actuating member 21 is rotated by means of the actuating shoulders 24A,24B being actuated upon via the protruding pins 18A,18B when the crank arm 10 is gripped and the hinged lever arms 18A,18B hence pushed against the action of the springs 15A,15B. When the locking plate 25 is rotated 1/16 of a full turn, the locking plate 25 will be aligned with the external engagement profile 30 of the driving head 29, integral with the crank arm base section 10', or fixedly secured thereto, which in turn allows alignment with a mating star shaped geometry, octagonal shape, of the winch socket 200 receiving portion 201 allowing introduction of the driving head 29 into the winch socket receiving portion 201 and removal of the driving head 29 from the winch socket receiving portion 201 through a downwards directed axial movement and an upwards directed axial movement respectively.

Thus, engagement with/disengagement from the winch socket 200 receiving portion through a vertical movement of the winch handle is allowed (see FIGS. 4A, 4C) while pressing on one, or both, hinged lever arms 11A,111B. Once the winch handle driving head 29 is received in the winch socket, and the hinged lever arms 11A,11B are released, the locking plate 25 will automatically be rotated to assume a position preventing the winch handle 100 from being removed from the winch socket 200 receiving cavity 201, i.e. the locking plate 25 is misaligned with external engagement profile 30 of the driving head 29 and hence also with the winch socket 200 receiving cavity 201 geometry (see FIG. 4B) by the hinged lever arms 11A,11B being urged outwardly by the springs 15A,15B, and via the actuating pins 18A,1 (actuation upon the actuating element 21 as described above.

The actuating connecting rod 26 in the shown embodiment is secured to the upper side of the actuating member upper plate 22 through which the actuator connecting rod 26 is received and protrudes by means of a securing portion 27 connected to, or integral with, the end of the actuator connecting rod 26. The securing portion 27 which comprises a through locking hole orthogonal to the rotation axis of the rod 27 for reception of a locking pin 28. It should be clear that the actuator connecting rod 26 can be secured to the actuating member 21 through any appropriate alternative means, or in any appropriate manner, this just illustrating one exemplary embodiment.

Figure 3:
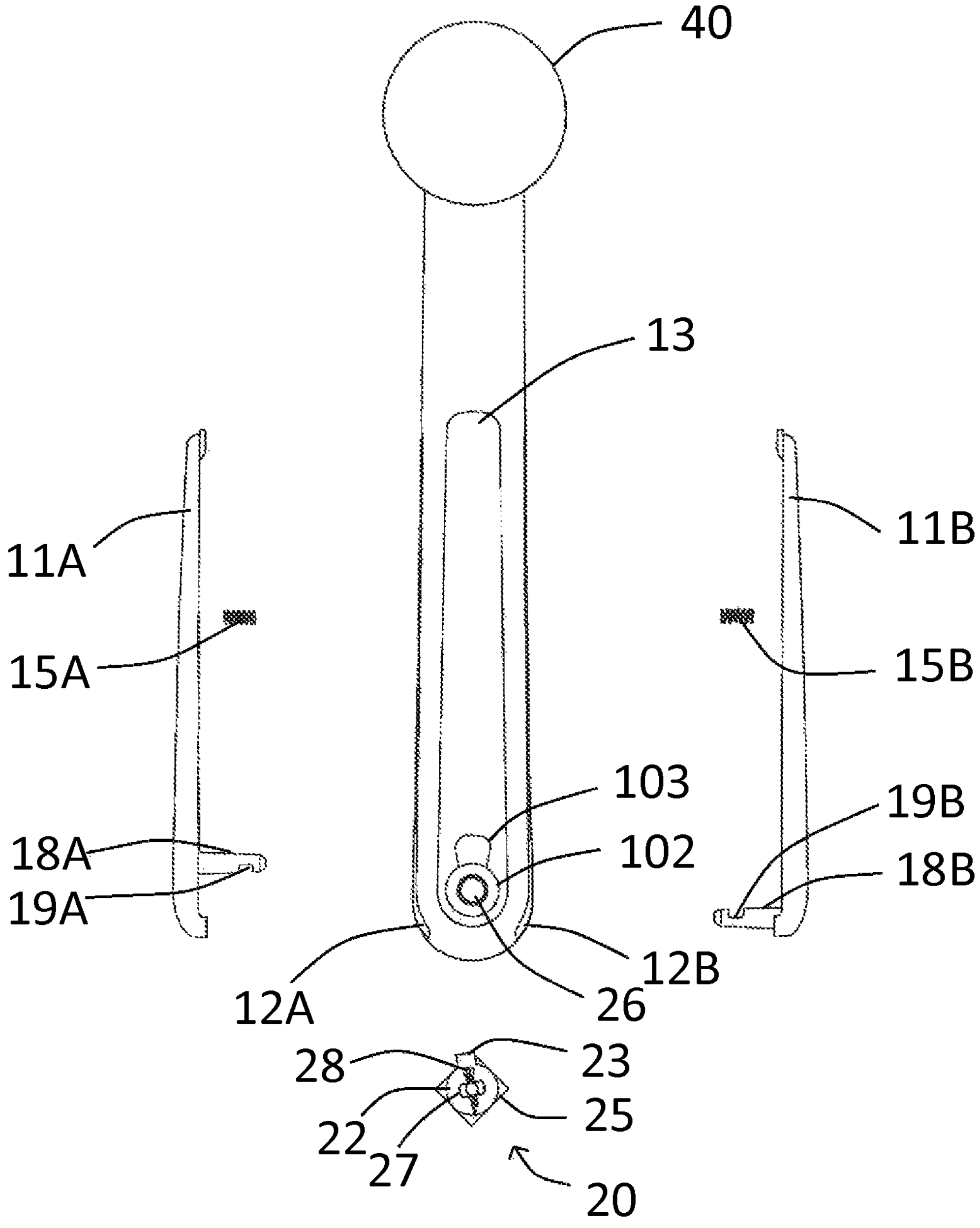
FIG. 3 is an exploded top view of the elements of the winch handle shown in FIG. 2.
Figure 4A:
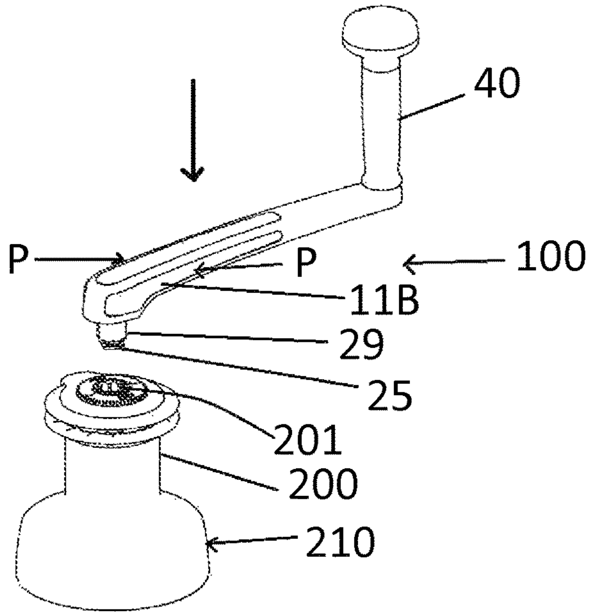
FIG. 4A is a schematic view in perspective showing a winch assembly comprising a winch handle and a winch, arrows illustrating how the winch handle is to be operated for engagement with the winch socket.

FIG. 3 is an exploded view from above of the winch handle 10 of FIG. 2 shown for illustrative purposes, and to more clearly show the hinged lever arms 11A,11B and the positioning of the actuating pins 18A,18B with recesses 19A,19B as discussed with reference to FIG. 2. Features and elements already having been discussed with reference to FIG. 2, will not be further discussed here. FIG. 4A schematically illustrates how the winch handle 100 is operated for engagement with a winch socket 200. One or both hinged lever arms 11A,11B are pressed (arrows P,P), e.g. by the winch handle 100 simply being manually grabbed anywhere along the crank arm. As explained more in detail with reference to FIG. 2 above, and FIGS. 5A-5E, 6A-6E below, locking plate 25 will be rotated, allowing the driving head 29 to be received in the winch socket receiving cavity 201, by the locking plate 25 being aligned with the external engagement profile 30 of the driving head 29 and hence also with the winch socket 200 receiving cavity 201 star shaped octagonal engagement profile. Elements discussed with reference to preceding figures will not be further discussed.

Figure 4B:
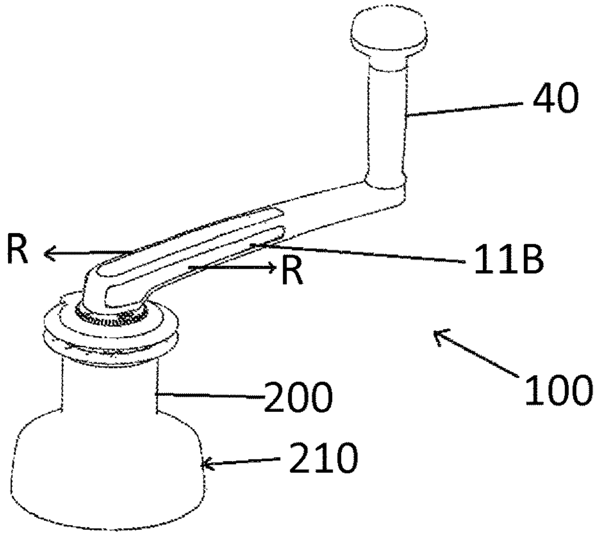
FIG. 4B is a schematic view in perspective showing the winch assembly when the winch handle has been introduced into the winch socket, arrows illustrating the operation for locking the winch handle to the winch.

FIG. 4B illustrates how the winch handle 100 is locked to the winch socket 200. Once the driving head 29 of the winch handle 100 is received in winch socket 200 receiving cavity 201, and the winch handle 100 is released, the hinged lever arms 11A,11B will be urged outwardly (arrows R,R) by means of the action of the compressions springs 15A,15B, and by means of the actuating pins 18A,18B acting on the actuating actuator element 20, the locking plate 25 operatively connected via the actuation rod 26, will rotate and assume a position in which the geometry is not aligned with the external engagement profile 30 of the driving head 29 and hence also not with the winch socket 200 with the geometry of the receiving cavity 201 of the winch socket. The winch handle 100 cannot be removed from the winch socket 200 and is thus also prevented from being accidentally removed.

Figure 4C:
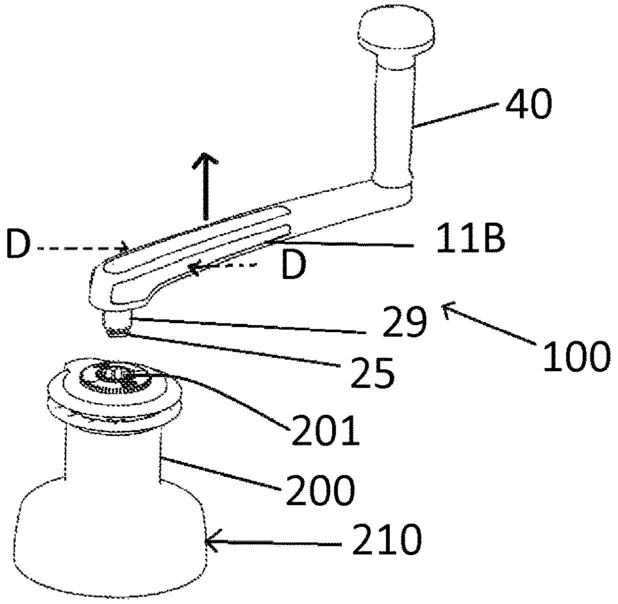
FIG. 4C is a schematic view in perspective showing the winch assembly comprising a winch handle and a winch, arrows illustrating the operation for disengaging the winch handle from the winch.

FIG. 4C schematically illustrates how the handle 100 is operated for disengagement from a winch socket 200. The winch handle 20 is simply grabbed, one or both the hinged lever arms 11A,11A being pushed inwards towards the crank arm base section (dashed arrows D,D) and the winch handle can be lifted up, which is enabled through the actuation on the locking plate 25 by means of actuating pins 18A,18B as described above, such that it will be aligned with the external engagement profile 30 of the driving head 29, the geometry of which hence being aligned with the geometry of the receiving cavity 201 of the winch socket receiving portion or cavity 201, thus allowing disengagement.

Figure 5A:
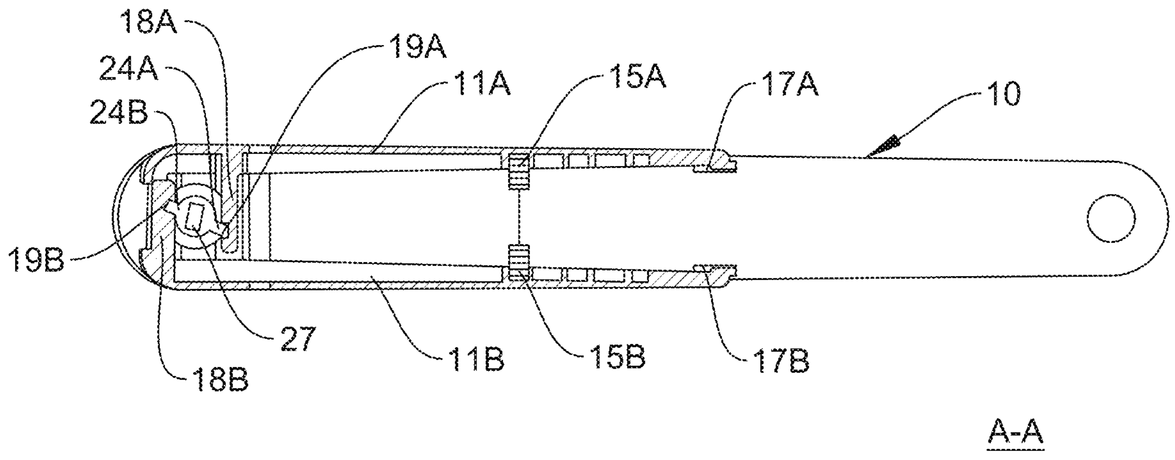
FIG. 5A is a schematic cross-sectional view from above of the winch handle shown in FIGS. 1,2 (without cover element) in a state for engagement with/disengagement from a winch socket.

FIG. 5A is a cross-sectional view taken through the winch handle along the section A-A in FIG. 1 in a state allowing engagement with, or disengagement from, a winch socket. The hinged lever arms 11A,11B have been gripped, urged against the action of the springs 15A,15B, and pivoted around their rotation axes in pivot arm recesses 17A,17B such that they are taken up in the crank arm recesses 12,12B in the crank arm base section 10'. Actuating pins 18A,18B protruding perpendicularly to the longitudinal extension of the respective hinged lever arms 11A,11B and arranged at different distances from outer ends of the hinged lever arms 11A,11B have actuated upon actuating member 21 by means of the pin gripping recess 19A engaging with first actuation shoulder 24A of the actuating member 21, pin gripping recess 19B engaging with second actuation shoulder 24B of the actuating member 21, rotating it, in this embodiment, clock-wise, until the actuating member 21 upper plate 22 is blocked from further rotation by protrusion 22 reaching wall 103' of the cutout 103 in the crank arm base section 10'; not shown in FIG. 5A; cf. see FIG. 5E.

Figure 5B:
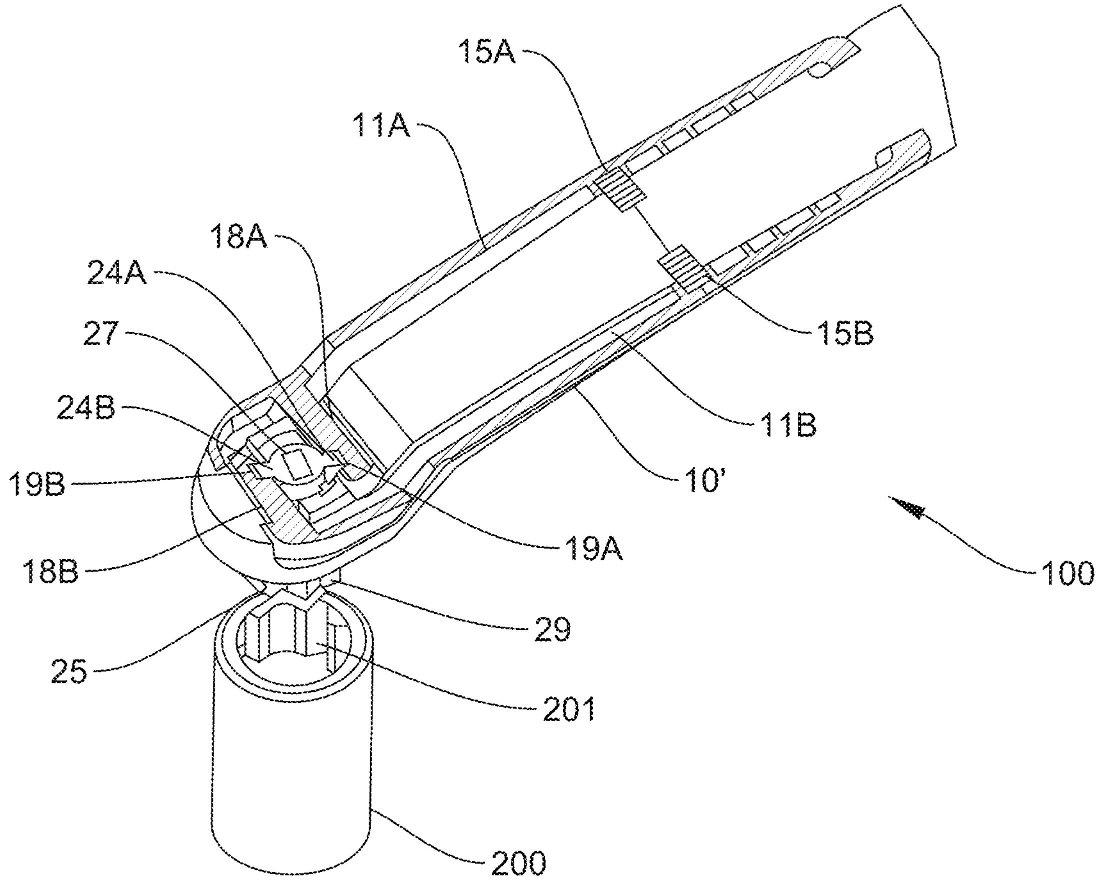
FIG. 5B is a schematic cross-sectional view in perspective from above of winch handle shown in FIG. 1 taken along the section A-A in the state allowing engagement/disengagement of the winch handle.

FIG. 5B is a view in perspective from above of the winch handle 100 in the same position as in FIG. 5A, i.e. in a position for engagement with winch socket 200, or just after disengagement from the winch socket 200 (the part of the winch handle with the handle part has been excluded since it has been shown above and no details are affected and need to be shown in order to explain the functionality). Since the actuating element 21 is rotated as described with reference to FIG. 5A, also the locking plate 25 connected thereto via actuator connecting rod 26 is rotated such that it will be aligned with the external engagement profile 30 of the driving head 29, which can be mated with the internal engagement profile of receiving cavity 201 of the winch socket, and the winch handle driving head can be introduced into the winch socket.

Figure 5C:
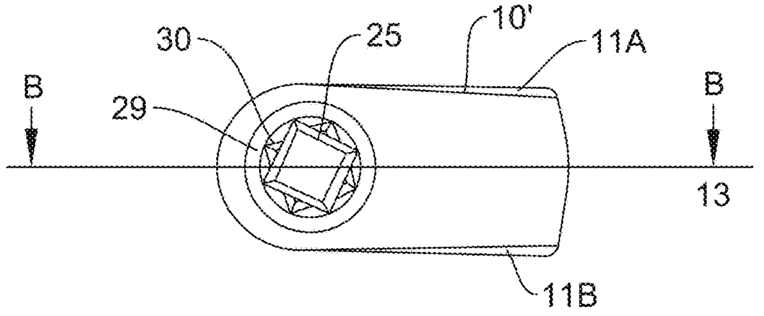
FIG. 5C is a schematic view from below of a part of the winch handle showing the locking plate in a position allowing engagement with/disengagement from a winch socket.

FIG. 5C is a schematic view from below of the end portion of the winch handle 100 showing the position of the locking plate 25 with respect to the octagonal engagement profile 30 of the driving head 29, wherein the square shaped locking plate 25 is so arranged that every second corner of the octagon coincides with a corner of the locking plate 25.

Figure 5D:
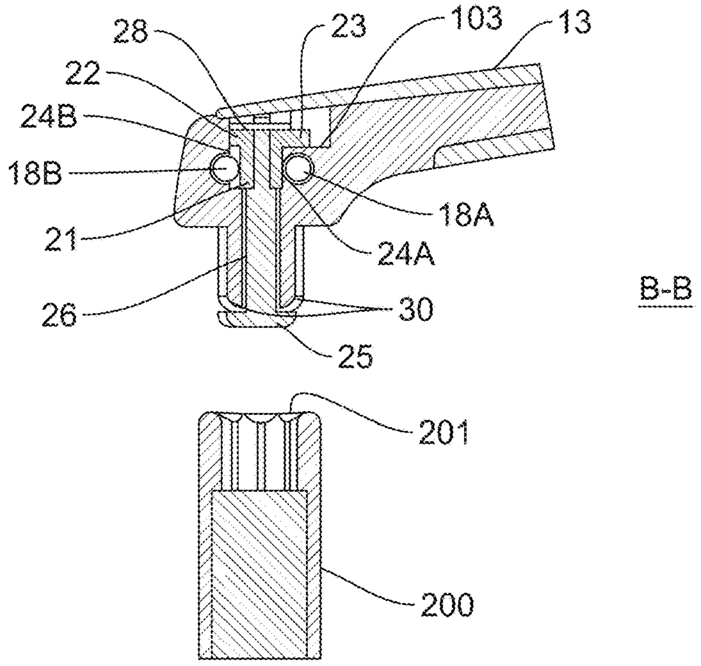
FIG. 5D is a schematic cross-sectional view taken along the section B-B in FIG. 5C.

FIG. 5D is a cross-sectional view taken vertically through part of the winch handle 100 along the section B1-B1 in FIG. 5C and through a winch socket 200 in which the winch handle is in a state allowing engagement as in FIGS. 5A-5C. In FIG. 5D can particularly be seen how the actuating element protrusion 23 is located in the cutout 103 and the first and second actuating shoulders 24A,24B being actuated upon by the actuating pins 18A,18B. It also shows the locking element 25 interconnected via the actuator connecting rod 26 with the actuating member 21 of the actuator element 20, and protruding out of the driving head 29 having an octagonal external engagement profile 30. In other respects features and elements already discussed with reference to the preceding figures will not be further discussed herein.

Figure 5E:
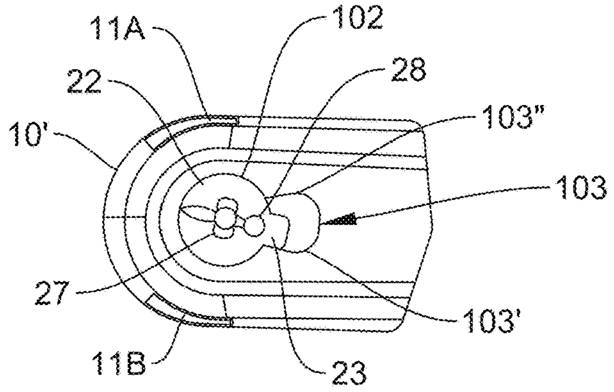
FIG. 5E is a schematic view from above of a part of the winch handle in FIG. 5A showing the actuating element blocked in a first position in the cut-out or recess in the crank arm.

FIG. 5E is an enlarged view from above of the front portion of the winch handle 100 illustrating the actuating member 21 with the locking pin 28 introduced through the locking opening in securing portion 27 for securing the actuator connecting rod 26 with the locking plate 26 to the actuating member 21 and the crank arm base section 10', and with the actuating member protrusion 23 in a position wherein it is blocked by the wall 103' of the cutout 103 from further rotation in an engagement position as in FIGS. 5A-5D. In other respects elements already discussed with reference to the preceding figures will not be further discussed here.

Figure 6A:
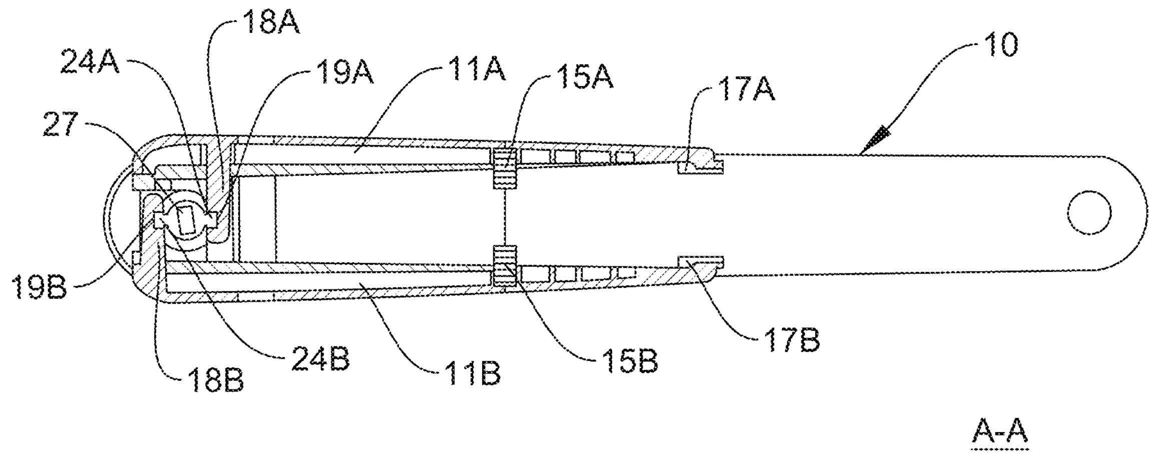
FIG. 6A is a schematic cross-sectional view from above of a winch handle as shown in FIG. 2 in a locking state, in which the winch handle driving head is locked in the winch socket.

FIG. 6A is a cross-sectional view taken through the winch handle along the section A-A in FIG. 1 similar to FIG. 5A but in a state in which the winch handle 100, with the driving head 29, cf. e.g. FIG. 2, FIG. 5D) introduced into a receiving cavity 201 of a winch socket 200 (cf. FIG. 6B), is locked therein. After introduction of the driving head 29 into the winch socket 200, the hinged lever arms 11A,11B have been released, urged by means of the springs 15A,15B, and pivoted around their rotation axes at pivot arm recesses 17A,17B such that they are rotated to protrude slightly from the recesses 12,12B in direction towards the front end of the crank arm base section 10'. Actuating pins 18A,18B have actuated upon actuating element 21 by means of the pin gripping recess 19A engaging with first actuation shoulder 24A of the actuating member 21, pin gripping recess 19B engaging with second actuation shoulder 24B of the actuating member 21, rotating it, in this embodiment counter clock-wise, until it is blocked from further rotation by the actuating member 21 upper plate 22 protrusion 22 reaching wall 103" of the cutout 103 in the crank arm base section 10'; not shown in FIG. 6A; cf. see FIG. 6E.

Figure 6B:
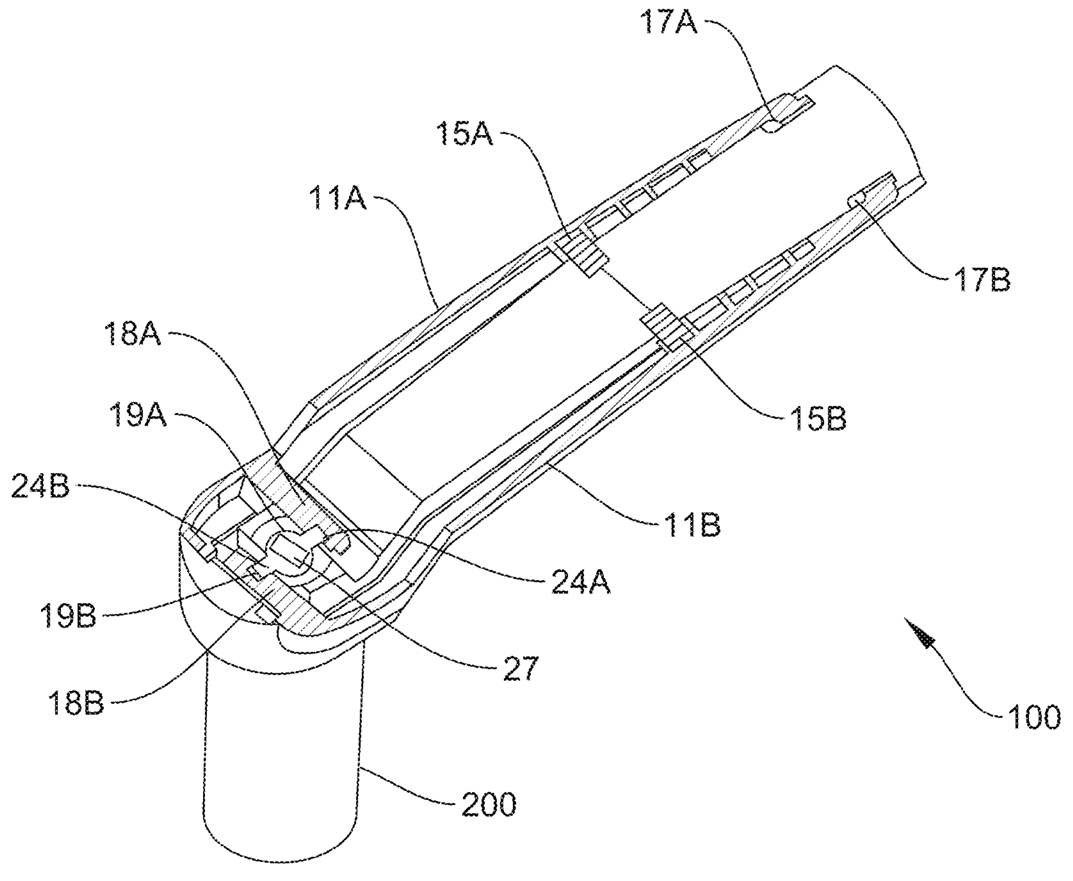
FIG. 6B is a schematic cross-sectional view in perspective from above of the winch handle shown in FIG. 1 taken along the section A-A in the locking state.

FIG. 6B is a view in perspective from above of the winch handle 100 in the same position as in FIG. 6A, i.e. in a locking state within a winch socket 200 (as in FIG. 5B the part of the winch handle comprising the handle part has been excluded since it has been shown above and no details are affected and need to be shown in order to explain the functionality). Since the actuating element 21 is rotated as described with reference to FIG. 6A, also the locking plate 25 connected thereto via actuator connecting rod 26 is rotated such that it will be misaligned with the external engagement profile 30 of the driving head 29, which hence is not aligned with the internal engagement profile of receiving cavity 201 of the winch socket, and the winch handle driving head 29 is securely locked within the receiving cavity 201 of the winch socket 200.

Figure 6C:
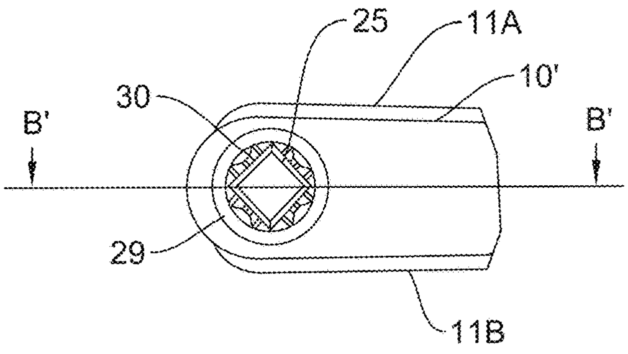
FIG. 6C is a schematic view from below of a part of a winch handle as shown in FIG. 6A in cross-section showing the locking plate in a locking position.

FIG. 6C is a schematic view from below of the end portion of the winch handle 100 in a locking state showing the position of the locking plate 25 being misaligned with respect to the octagonal engagement profile 30 of the driving head 29, the square shaped locking plate 25 being so arranged that instead of an external profile in the shape of an octagon, the driving head 29 with the locking plate 25 will provide an external profile having 12 vertices, a dodecagon.

Figure 6D:
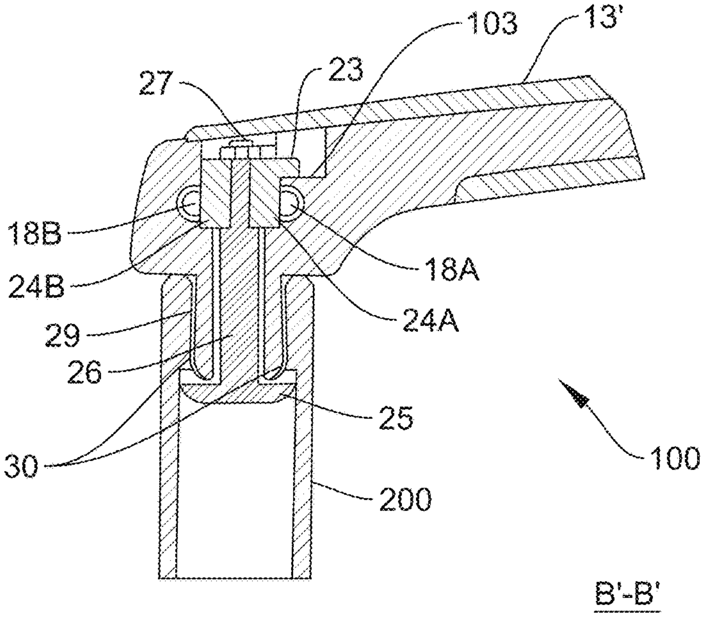
FIG. 6D is a schematic cross-sectional view taken along the section B'-B' in FIG. 6C.

FIG. 6D is a cross-sectional view taken vertically through part of the winch handle 100 along the section B'-B' in FIG. 6C and through a winch socket 200 in which the winch handle is in a locking state as in FIGS. 6A-6C. In FIG. 6D can particularly be seen how the actuating element protrusion 23 is located in the cutout 103 and the first and second actuating shoulders 24A,24B being actuated upon by the actuating pins 18A,18B. It also shows the locking element 25 interconnected via the actuator connecting rod 26 with the actuating member 21 of the actuator element 20, and protruding out of the driving head 29 hence providing a dodecagonal external engagement profile 30 not allowing removal of the winch handle 100 from the winch socket. In other respects features and elements already discussed with reference to the preceding figures will not be further discussed herein.

Figure 6E:
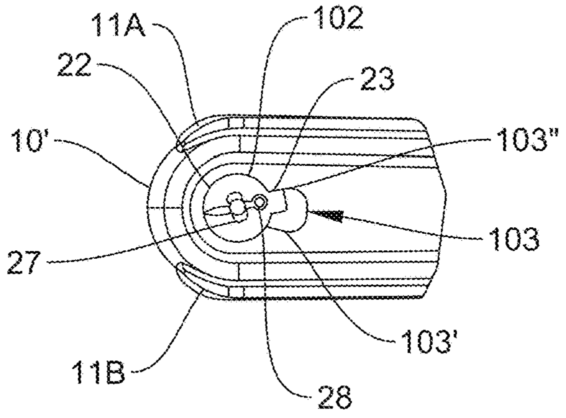
FIG. 6E is a schematic view from above of a part of the winch handle shown in FIG. 6A showing the actuating element blocked in a second position in the cut-out or recess in the winch handle crank arm.

FIG. 6E is an enlarged view from above of the front portion of the winch handle illustrating the actuating member 21 with the locking pin 28 introduced through the locking opening in securing portion 27 for securing the actuating element rod 26 with the locking plate 26 to the actuating member 21 and the crank arm base section 20', and with the actuating member protrusion 23 in a position wherein it is blocked by the wall 103" of the cutout 103 from further rotation in an engagement position as in FIGS. 6A-6D. In other respects elements already discussed with reference to the preceding figures will not be further discussed here.

The actuating member 21, to which the locking plate 25 is fixedly connected via the actuator connecting rod 26, which is taken up within the actuating member 21 cylindrical receiving portion 24, is here axially secured to the crank arm base portion 10' by means of the locking pin 28 introduced through an opening in the securing portion 27 of the actuator connecting rod 26 protruding through a recess in the upper plate 22 of the actuating member 21.

It should be clear that the present invention is not limited to a winch handle with an octagonal shape for a winch socket having an internal octagonal engagement profile; essential being that in an engagement position the locking plate and the external profile of the handle driving head are aligned, and correspond to an engagement profile of a receiving portion of a winch socket, whereas in a locking position they are misaligned, preventing voluntary or accidental removal of the winch handle from the winch socket, and that a grip anywhere along the crank arm can be used to allow alignment of the locking plate with the external profile of the driving head, allowing axial insertion into/removal from a winch socket, and the inventive concept is also not limited to a particular winch socket or a winch socket such as shown and described with reference to the in FIG. 1, FIGS. 4A-4C illustrated embodiment; on the contrary it may be of different kinds and be varied in a number of different manners.

It should also be clear that in alternative embodiments, a winch handle may, instead of one or more hinged lever arms, comprise one or more operating elements in form of spring biased slidingly and/or translationally movable elements or lever arms performing a sliding or translational movement in a horizontal plane, in parallel with the crank arm base section, or transversal to the longitudinal extension of the crank arm base section can be used, allowing a one hand grip for exerting or applying a force on a spring element to bring it into an engagement/disengagement state and release of the hand grip to bring it into locked state in which engagement/disengagement (release) is prevented.

Also the shape of the locking element and of the external engagement profile of the driving head may be different, as long as, through rotation of the locking plate in one direction, it is aligned with the engagement profile, whereas through rotation in an opposite direction, it is brought into misalignment with the engagement profile; other shapes of locking plate, and other polygonal engagement profiles hence being possible.

It is an advantage of the invention that a cranking arrangement, particularly a winch handle, is provided which easily can be engaged with/disengaged from a driving arrangement, particularly, but not exclusively, a manually operable winch for a sailing boat, through gripping anywhere along the elongate crank arm, using only one hand, e.g. a palm grip, and which when engaged, cannot be accidentally removed, but is securely locked thereto.

It is also an advantage that a cranking arrangement is provided which is robust and wear resistant. Another advantage is that a solution is provided which combines a rotational locking mechanism with a one hand grip mechanism for engagement/disengagement.

It should be clear that the invention is not limited to the explicitly described embodiments but that it can be varied in several ways within the scope of the appended claims.

It should also be clear that the content of described embodiments freely can be varied and combined.

The invention claimed is:

1. A crank arrangement for operating a driving arrangement, said crank arrangement comprising:

an elongate crank arm with a hollow driving head disposed at one end thereof and a handle part at a distance from the driving head, the driving head and the handle part protruding substantially perpendicularly to the crank arm in substantially opposite directions, the driving head comprising an external engagement profile, a locking plate arranged at an outer end of an actuator element rotatably taken up within the hollow driving head, a lever arrangement for rotating the locking plate from a second position in which the locking plate is misaligned with the engagement profile of the driving head to a first position in which the locking plate is aligned with the engagement profile of the driving head, wherein the lever arrangement comprises at least one spring loaded lever arm extending in parallel to an external longitudinal wall of the crank arm and mounted movably with respect to a crank arm base section, said at least one lever arm comprising engaging means being adapted to, when said crank arm is gripped such that at least one of said at least one lever arm(s) is moved, actuate upon an actuating member of said actuator element which is connected to the locking plate such that the locking plate will perform a rotational movement in a direction to assume the first position in which the locking plate is aligned with the engagement profile of said driving head, whereas when the at least one lever arm is released, the locking plate will be actuated upon to perform a rotational movement in an opposite direction to assume the second position in which the locking plate is misaligned with the engagement profile of the driving head, a means for limiting the rotational movement of the actuating member are provided, and in that the locking plate can be transferred from the second, misaligned, position to the first, aligned, position allowing engagement with a driving arrangement by means of gripping the crank arm with one hand while moving the at least one lever arm(s) against a spring action, and the locking plate can be transferred from the first aligned position to the second misaligned position locking to a driving arrangement by means of releasing the grip on the crank arm.

2. The crank arrangement according to claim 1, wherein the crank arrangement comprises a winch handle for operating a winch.

3. The crank arrangement according to claim 2, wherein when the locking plate is in the first position and aligned with the engagement profile of the driving head, engagement with/disengagement from a winch socket is allowed, and in that when the at least one lever arm(s) is/are released and the locking plate rotated to assume the second position and is misaligned with the engagement profile of the driving head, the driving head, being received in a receiving cavity of the driving arrangement, is locked to the driving arrangement.

4. The crank arrangement according to claim 1, wherein the at least one lever arm comprises two hinged lever arms extending in parallel on opposite external side walls of the crank arm, each hinged lever arm being pivotally mounted around a respective rotation axis at a distance from an end portion at which the handle part is arranged, and by means of a respective compression spring urged outwardly, each hinged lever arm at opposite end portions being operatively connected to the actuator element, the hinged lever arms hence being movable through rotation.

5. The crank arrangement according to claim 4, wherein the means for limiting the rotational movement of the actuating member comprises a first actuation shoulder and a second actuation shoulder, and wherein each hinged lever arm engaging means comprises a protruding pin, each said protruding pin being located at a respective distance from the outer end of the respective hinged lever arm, wherein the distance from the outer end of one of the hinged lever arms at which one of the protruding pins is located exceeds the distance from the outer end of the other hinged lever arm at which the other protruding pin is located, such that one of the protruding pins via an opening on one side of the crank arm base section will engage with the first actuation shoulder provided on one outer side of the actuating member and the other protruding pin via an opening on the opposite side of the crank arm base section will engage with the second actuation shoulder provided on an opposite outer side of the actuating member, hence allowing the actuating element to be rotated when the crank arm is gripped such that at least one of the hinged lever arm(s) is/are urged towards the crank base section.

6. The crank arrangement according to claim 5, wherein each protruding pin comprises a gripping recess, the gripping recesses being adapted to engage with a respective first actuation shoulder or second actuation shoulder.

7. The crank arrangement according to claim 6, wherein each protruding pin comprises a protrusion, the protrusions being adapted to engage with a respective one of the first or second actuation shoulders.

8. The crank arrangement according to claim 5, the actuating member comprises a hollow upper cylindrical portion adapted to receive an upper end of an actuator connecting rod, an upper plate comprising a circular plate with a protrusion, the first and second actuation shoulders being provided on opposed sides of the cylindrical portion and extending axially downwards from the upper plate in the direction towards the locking plate.

9. The crank arrangement according to claim 8, wherein the crank arm base section on an upper side comprises a recess comprising a circular portion coaxial with the hollow driving head and a cutout which is directed towards the handle part, said cutout forming blocking means, the recess being dimensioned and located to allow reception of the upper plate of the actuating element, the circularly plate of the actuating element plate being of substantially the same dimensions as the circular portion, but smaller allowing the circularly plate to be received in the circular portion, the first actuation shoulder of the upper plate having transversal dimensions smaller than the cutout allowing rotation of the upper plate between a first position, in which the first actuation shoulder is blocked by a side wall of the cutout, when the crank arm is gripped such that the at least one hinged lever arm is/are pushed towards the crank arm base section allowing engagement/disengagement of the crank arrangement, and a second position in which the first actuation shoulder is blocked by an opposed wall of the cutout corresponding to a locked position (a neutral position) in which the at least one hinged lever arm is/are released and in which the handle cannot be engaged with/disengaged from a winch socket.

10. The crank arrangement according to claim 8, wherein for rotating the actuating element from the first position to the second position and vice versa, it is rotated an angle of 22.5°, corresponding to 1/16 of a full turn, a rotation from the first to the second, locking, position being automatically achieved through release of the hinged lever arms.

11. The crank arrangement according to claim 8, wherein the actuator element further comprises a securing portion connected to or integral with an upper end, opposite to the end at which the locking plate is provided, of the actuator connecting rod, said upper end protruding through the upper plate and the securing portion being disposed on an upper side of the upper plate, the securing portion comprising a through opening for reception of a locking pin axially locking the actuator element to the crank arm base section.

12. The crank arrangement according to claim 4, wherein the crank arm base section comprises two elongate recesses provided on opposite outer sides and being adapted for reception of the hinged lever arms such when they are gripped, and urged inwardly against the action of the compression springs, and pivoted around their rotation axes, they are substantially taken up in said elongate recesses, whereas in a released position respective front portions of the hinged lever arms protrude from the elongate recesses.

13. The crank arrangement according to claim 1, wherein the driving head has an octagonal cross-sectional external shape forming an engagement surface and that the locking plate is square-shaped.

14. The crank arrangement according to claim 1, wherein the crank arm base section comprises an upper recess in a front end of which a recess is located and a protective cover element adapted to cover said upper recess, the protective cover element fixedly or releasably connected to the crank arm base section, the recess comprising a circular portion coaxial with the hollow driving head and a cutout which is directed towards the handle part.

15. The crank arrangement according to claim 1, wherein the locking plate is rotationally coupled with the actuating member.

16. An assembly comprising a winch for a sailing boat and a winch handle for manual operation of the winch, wherein the winch handle comprises a crank arrangement as in claim 1, that the winch comprises a winch socket with an external engagement profile mating with an internal engagement profile of the driving head of the crank arrangement.

17. The assembly according to claim 16, wherein the internal engagement profile and the external engagement profile each having an octagonal cross-sectional shape.

18. A method of operating a crank arrangement according to claim 1 for manually operating a sailing boat winch.

19. The crank arrangement according to claim 1, wherein the at least one spring loaded lever arm mounted movably translationally or rotationally with respect to the crank arm base section.

20. The crank arrangement according to claim 1, wherein each of the at least one lever arm being pivotally mounted around a respective rotation axis disposed in a respective opening or recess in the crank base section at a distance from an end portion at which the handle part is arranged.

* * * * *